United States Patent Office.

ERNST SÜVERN, OF HALLE, PRUSSIA.

Letters Patent No. 69,043, dated September 17, 1867.

IMPROVED DISINFECTING COMPOUND.

The Schedule referred to in these Letters Patent and making part of the same.

TO ALL WHOM IT MAY CONCERN:

Be it known that I, ERNST SÜVERN, of Halle, in the Kingdom of Prussia, have invented a new and improved Disinfecting Compound; and I do hereby declare that the following is a full, clear, and exact description thereof, which will enable those skilled in the art to make and use the same.

This compound is intended particularly for the disinfection of the waste water of beet-sugar manufactories, starch manufactories, and other manufacturing establishments, and it can also be used with advantage for the disinfection of sewers, and for every water which has been defiled by the admixture of organic substances.

My compound consists of quicklime, coal tar, and chloride of magnesium, and these ingredients are mixed together in about the following proportion: quicklime one hundred parts; coal tar eight parts; chloride of magnesium ten to twenty-five parts; water (by weight) one thousand to fifteen hundred parts.

In preparing my composition, I first slake the lime in a small quantity of water, (if much water is used it becomes difficult to add the tar,) and when the lime is in the state of its greatest heat, I add the tar, and then I increase the quantity of water to the requisite proportion, as above stated, and finally I add the chloride of magnesium, which readily dissolves in the water and enters into a new chemical combination with the lime and water, forming chloride of lime and hydrate of magnesium, which latter compound is the principal discoloring and purifying agent in my disinfecter. The quantity of my disinfecter requisite to produce the desired effect in treating waters of different nature or quality can be readily determined by experience. As soon as a sufficient quantity of the disinfecter has been added to the dirty water, the water clears, and a sediment is formed which rapidly sinks to the bottom. If an insufficient quantity of the disinfecter is added, the water remains milky and muddy, and no sediment is formed. The water after having been treated with my disinfecter possesses a strong alkaline reaction which originates from the lime. After a few days this reaction disappears, the lime being transformed into carbonate of lime by the action of the carbonic acid contained in the atmosphere, and in order to enable the atmosphere to come in contact with the water it is desirable to keep the disinfected water in motion by stirring, or simply by allowing it to run off freely. In order to obtain a uniform supply of the disinfecting compound, various apparatuses may be designed which it is needless here further to describe.

By the action of my compound the most polluted waters flowing from manufactories and the miry fluid discharged from sewers in cities are rendered so pure that the same can be safely imbibed by cattle.

What I claim as new, and desire to secure by Letters Patent, is—

A disinfecting compound composed of the ingredients herein described, and mixed together substantially as and about in the proportion set forth.

ERNST SÜVERN.

Witnesses:
    J. H. F. PRILLWITZ,
    J. C. A. LEHMANN.